Dec. 2, 1924.

1,517,994

F. W. KEGEL

TIRE CHAIN

Filed March 5, 1924

Fred W. Kegel,
INVENTOR.

BY
ATTORNEYS.

Patented Dec. 2, 1924.

1,517,994

UNITED STATES PATENT OFFICE.

FRED W. KEGEL, OF FARGO, NORTH DAKOTA.

TIRE CHAIN.

Application filed March 5, 1924. Serial No. 697,012.

*To all whom it may concern:*

Be it known that I, FRED W. KEGEL, a citizen of the United States, residing at Fargo, in the county of Cass and State of North Dakota, have invented certain new and useful Improvements in Tire Chains, of which the following is a specification.

My present invention pertains to devices for tightening tire chains or subjecting the same to tension; and it has for its object to provide a device of the character described, which is simple, can be readily applied to a tire chain, and readily disconnected and adjusted to pick up slack in the chain which has ensued after conventional wear.

To the attainment of the foregoing, the invention consists in the improvements as hereinafter described and definitely claimed.

In the accompanying drawing, forming a part of this specification:

Similar numerals of reference designate corresponding parts in all of the view of the drawing.

Figure 1:
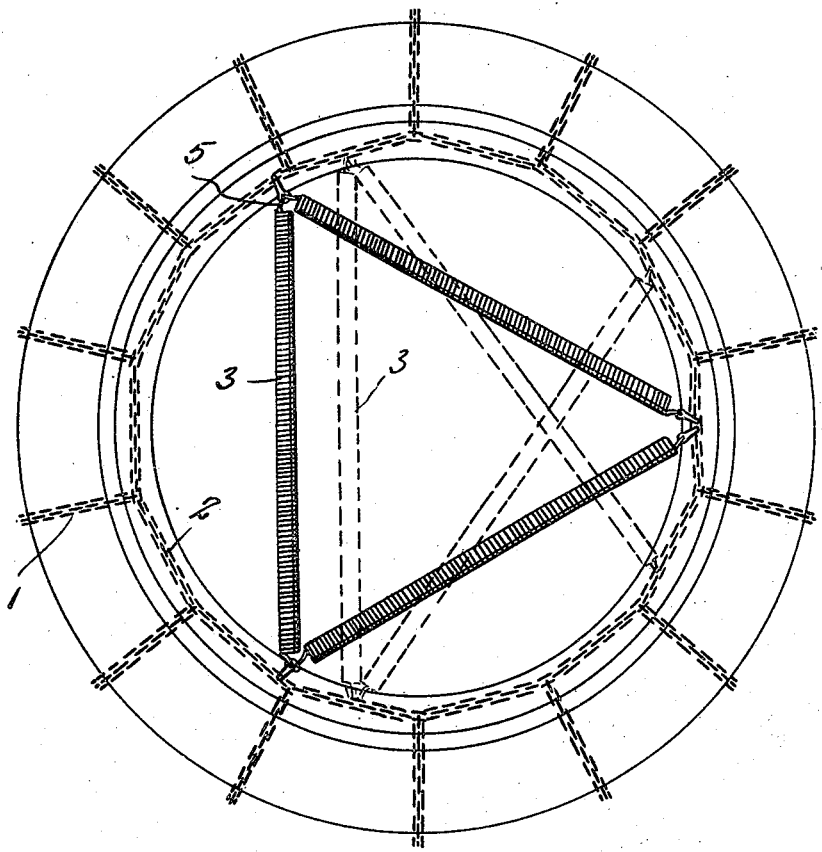
Figure 1 is a side elevation illustrating my novel tightening or tensioning devices as properly applied to a conventional tire chain.
Figure 2:
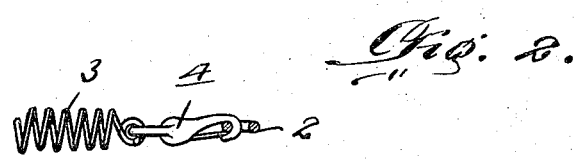
Figure 2 is an enlarged detail elevational view illustrating the preferred means for effecting connection between the retractile spring applied to the device and the side portion of the tire chain.

The tire chain illustrated is of conventional type though it may be of any other construction compatible with the purpose of my invention without affecting the latter. As illustrated, the tire chain comprises the transverse chain portions 1 and side chain portions 2, to which the ends of the transverse chain portions are permanently connected as illustrated.

In furtherance of my invention, I employ three retractile springs 3, the said springs being relatively arranged in the first instance to define a triangle. One end of each of two of the retractile springs is permanently connected to the third spring at the ends of the latter. The connections 5 are equipped with connecting devices, in the form of snap hooks 4. It will also be noted that the springs alluded to as having the free ends are provided at such ends with connecting devices 4 also in the form of snap hooks.

In the application of my invention, the tire chain is placed and secured in the ordinary well known manner on a wheel, and then the several hooks 4 comprised in my novel device are connected to the side portion of the tire chain in the relation shown by full lines in Figure 1. When applied as stated, the tightening or tensioning device will suffice for an indefinite period of time to hold the tire chain sufficiently tight on the wheel to avoid slapping or striking of the tire chain against a fender. When, however, wear has taken place on the tread of the tire, it is necessary to take up slack of the tire chain, and to meet this condition, the connecting devices at the free ends of the retractile springs alluded to are disconnected from the side portion of the tire chain, and then the retractile springs alluded to are shifted to the position shown by dotted lines in Figure 1, i. e., are arranged in taut relation, and while in such relation are connected to the side portion of the tire chain. Manifestly, when this manipulation is carried out, slack of the tire chain will be taken up and the same will be rendered snug and secure upon the wheel.

It will be manifest from the foregoing that my novel tightening or tensioning device will be simple and inexpensive in construction, is susceptible of ready application and adjustment, and is well adapted to withstand the usage to which automobile wheel skid chains are ordinarily subjected.

I have entered into a detailed description of the present and preferred embodiment of my invention, in order to impart a full, clear, and exact understanding of the same. It is not desired however to confine myself to the specific construction and relative arrangement of parts herein described, inasmuch as in the manufacture of the invention, such changes and modifications may be made as clearly fall within the scope of my invention as claimed.

Having described my invention, what I claim and desire to secure by Letters Patent is:

A tire chain tightener comprising a trinity of coiled springs, hooks pivotally connected one at each end of the intermediate spring, each of said hooks being pivotally connected with the inner end of one of the terminal springs and a hook pivotally connected with the outer end of each terminal spring of the set of springs.

In testimony whereof I affix my signature.

FRED W. KEGEL.